June 21, 1955  J. KLUMPP  2,711,122
CAMERA STAND HARNESS
Filed July 2, 1952  2 Sheets-Sheet 1
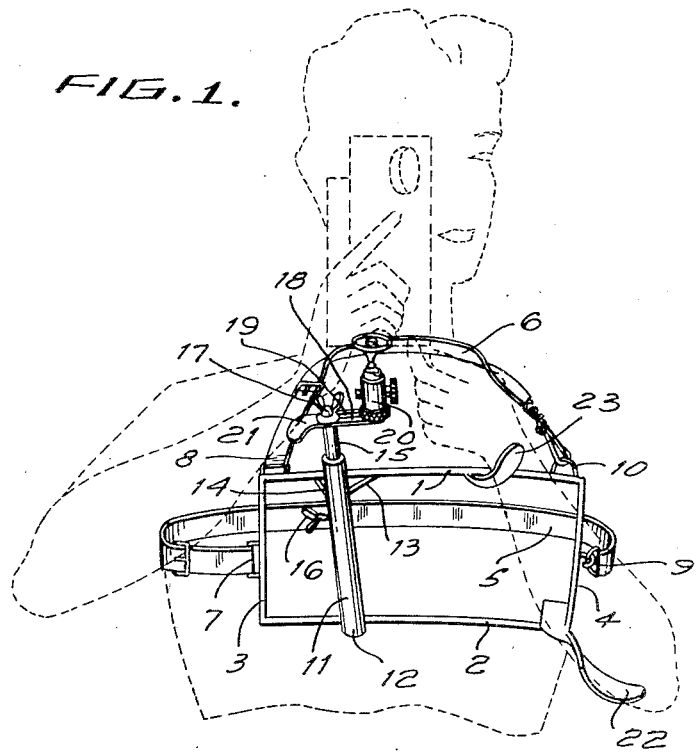
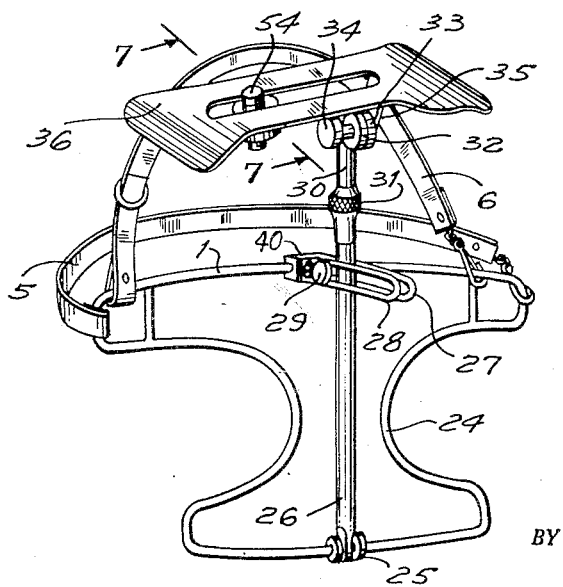
INVENTOR.
BY

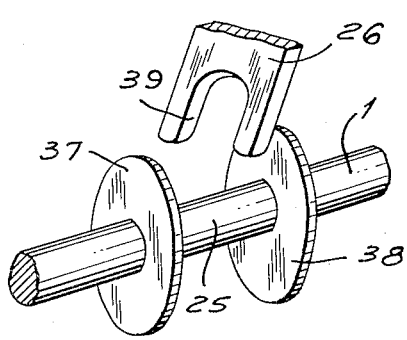
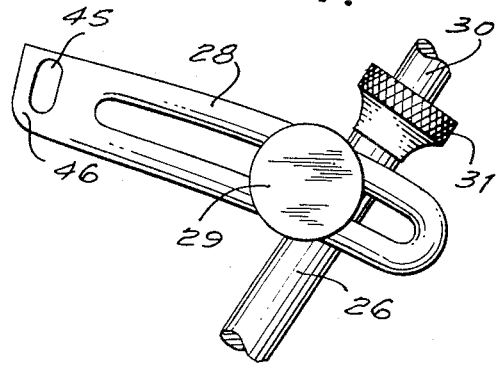
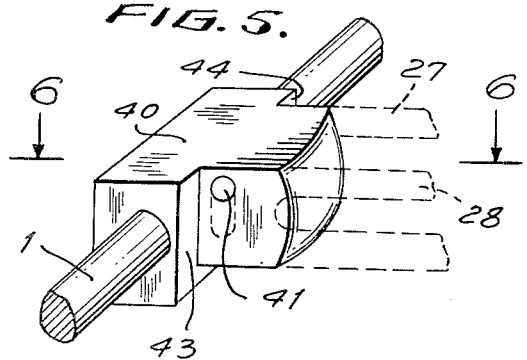
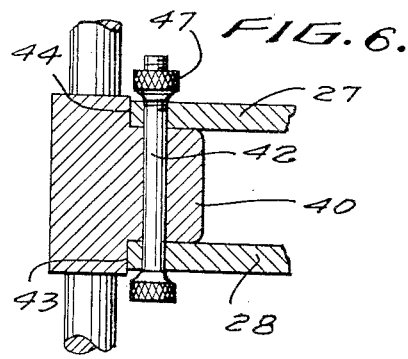
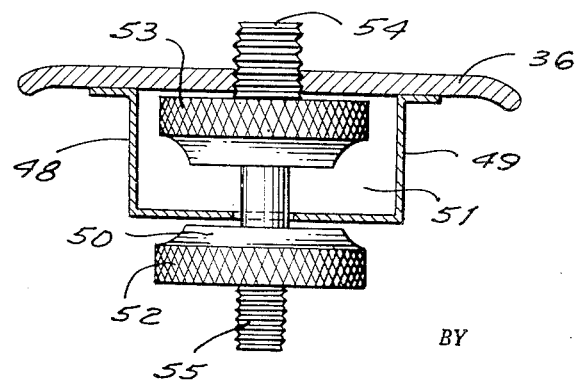

2,711,122

CAMERA STAND HARNESS

Jean Klumpp, Nice, France

Application July 2, 1952, Serial No. 296,819

Claims priority, application France July 5, 1951

10 Claims. (Cl. 95—86)

When taking photographs or shooting films, it is often useful or necessary to mount the camera on a stable support, generally a stand, to avoid defects in the films.

Stands are always heavy, cumbersome and difficult for the operator to move, especially in a crowd or in places difficult of access.

The invention relates to a camera stand harness consisting of a combination of belts, fastenings, ties and springs of any type, either extensible or inextensible, and/or of rigid parts of metal or other material, adjustable or non-adjustable, placed on and fixed to the operator's shoulders and the upper part of his chest, the said harness comprising a rigid fitting on to which the camera or motion picture camera is screwed, as if on to a stand.

Moreover, adjustable or non-adjustable fittings of metal or any other material, serving as rests for the operator's arms while the camera is in use, may also be mounted on the harness.

In certain special embodiments of the invention it will often be advisable to adopt:

1. An X-shape for the tubular frame of metal or any other material that will be attached to the user's chest, the said shape having several advantages as regards centering the device, to which may be added that of enabling the device to be conveniently used by ladies.

2. A device of any kind for adjustment in depth, that is to say the distance from the user's eye to the camera view-finder, by simply moving one or several parts.

3. A camera stage free to swivel in all directions, on to which the camera is fixed directly by a screw of the same thread as the camera nut, tightened by means of a milled nut; the said stage may be shaped near its edge to form rests for the user's palms.

4. A detachable tubular stand, forked at its lower end and hooked to the frame between two positioning collars.

5. Slide-bars which are perpendicular to the said frame in their working position, and can be folded back by any means about the point of attachment to the said frame, into a position approximately in the plane of the said frame.

A double "Kodak-Congress" screw with a central slot, held permanently in a guide located under the camera stage, enabling the camera to be conveniently and quickly mounted on the stage.

Various embodiments of the invention given for illustrative and not limiting purposes are described below and shown on the accompanying drawings which represent:

Figure 1 is a perspective view of one form of a camera stand harness according to the invention as it appears when worn by a user;

Figure 2 is a view similar to Fig. 1 showing a modification of the camera stand harness;

Figure 3 is a detailed perspective view of a portion of Fig. 2 showing the method of attaching the detachable stand fork to the tubular frame;

Figure 4 is a side view of the slide-bars used in the modification of Fig. 2 for adjusting the position of the tubular stand.

Figure 5 is a detailed perspective view of the assembly at the inner ends of the slide-bars;

Figure 6 is a sectional view on the line 6—6 of Fig. 5;

Figure 7 is an enlarged sectional view on the line 7—7 of Fig. 2.

The harness consists of a tubular metal frame 1—2—3—4 of which tubes 1 and 2 are curved in such a way as to fit the curve of the operator's chest. These tubes, especially numbers 1 and 2, can be made adjustable in length by socketing or any other method, so that they will fit each operator suitably whatever may be his height or girth.

Adjustable straps 5 and 6 are permanently fixed to the metal frame by riveting or any other method, on buckles or other fittings, at points 7 and 8, and may be fixed in an easily detachable way, on the contrary, by hooks, clasps, snap-hooks or any other fastenings, to points 9 and 10.

Belt 5 is intended to grip the operator's body at the level of the upper part of his chest.

Belt 6 fits around the operator's shoulder and the nape of his neck.

The harness when adjusted and fitted, forms a solid base for the camera stand; this adjustable stand consists of a tube 11, welded at 12 near its base to tube 2, and, on the other hand, rigidly connected to tube 1 by two metal parts 13 and 14, welded to tube 11 and to tube 1.

Inside this tube 11 may slide a rod 15 which is fixed in position by a thumb-screw 16. At the end of this rod 15 is a thumb-screw 17 fixing the position of a small plate free to turn in all directions and adjustable along its median slot 19 through which screw 17 passes; at one of its extremities this small plate carries a screw that is not visible on the figure, and on which the ball and socket joint 20 is mounted, so it is usual to fit a ball and socket joint at the end of a camera stand.

The camera or motion-picture camera shown in dotted lines, as is the operator, is screwed in the ordinary way on to this ball and socket joint 20.

It will be noticed that the other end 21 of the small plate 18 is shaped like a spatula to serve as a rest for the operator's right arm when the camera or motion-picture camera is in use.

In the same way, his left arm is supported by an elbow rest 22, welded to tube 2, and by a strip of metal 23 welded to tube 1.

All these supports may of course be made adjustable in position by any means.

It is clear that by the use of a camera stand harness according to the invention, the operator, at the time of any event of which he desires to take successive views starting from different points, has at his disposal his camera or motion-picture camera permanently mounted on a stable support such as the operator himself, always fixed before his eye, and following immediately all his movements.

Moreover, the operator has both arms and both hands quite free between shots; when shooting, his arms are supported comfortably on suitable rests.

On the second embodiment of the invention, the so-called X shape of the tubular metal frame 24 will first be noticed; this shape enables it to bear in the middle on the user's breastbone and at the sides on his chest, thus ensuring great steadiness; the said shape also enables ladies to use the device without discomfort.

In view of the very great differences in camera patterns, it has been found necessary to provide for adjustment of the position of the camera and of its distance from the user's eye;

For this purpose, in this embodiment of the invention, a tube 26, which passes between two segmental slide-bars 27 and 28, welded to the upper part of the frame 24 and perpendicular to the said frame, is hinged to the base of the frame 24 at a point 25.

A milled screw 29 attached to tube 26 enables its position to be fixed in relation to the slide-bars 27 and 28 and so permits the operator to move the camera at will, further from or nearer to his eye.

At the top of a rod 30, the position of which is adjustable in height and may be fixed by means of the milled nut 31, is a notched disc 32, the position of which in relation to a second notched disc 33 is fixed by means of the milled nut 34.

Notched disc 32 is firmly connected to rod 30, and notched disc 33 to arm 35 supporting the perforated stage 36 on which the camera is securely fixed by a milled screw of the same thread as the nut of the camera.

It will be noticed that the ends of stage 36 are rounded and shaped to serve as rests for the palms of the operator's hands.

If a device that can be taken to pieces and easily carried flat is required, the following detail devices may be utilised:

At point 25 on frame 24, two positioning collars 37 and 38 are welded, leaving between them exactly the space necessary to insert the lower part of tube 26 which is cut in the shape of a fork 39 exactly fitting the frame 24. The device thus forms a detachable mounting that is brought into use by simply inserting the fork 29 between collars 37 and 38 on frame 24.

In order to allow removal of slide-bars 27 and 28, they may be fitted by means of a screw to a support 40 permanently fixed exactly in the centre of the upper part of frame 24 at the place where the said slide-bars 27 and 28 were previously welded to the said frame, as described above.

The removable device shown in Figures 4, 5 and 6 would be preferred to a simple mounting on which the slide bars are held by tightening up a screw and nut. Support 40, welded to frame 24, is provided with a circular hole 41 near its top which serves as a passage for fixing screw 42. Support 40 also comprises shoulders 43 and 44 on its sides against which the ends of slide-bars 27 and 28 will bear during use.

Slide-bars 27 and 28 have an oval hole 45 and a rounded angle 46 at these ends. During use, the device is held in position by tightening up nut 47, and by the ends of slide-bars 27 and 28 which are thrust downwards on screw 42, and which also bear against shoulders 43 and 44, forming a rigid whole.

After use, and after removal of tube 26 by unscrewing screw 29, on the one hand, and by freeing fork 39, on the other, screw 42 and nut 47 will be slightly unscrewed, slackening the whole device. Slide-bars 27 and 28 are then raised in such a way that screw 42 takes up its position at the bottom of oval hole 45. At this moment the rounded angle allows slide-bars 27 and 28 to hinge about screw 42 approximately into the plane of frame 24, thus making it easier to carry the device.

On stage 36 are welded two sheet metal ribs 48 and 49 forming guides between which is fitted a double screw 50 with a median slot 51 into which ribs 48 and 49 are inserted.

Double screw 50 also comprises two milled heads 52 and 53 and two screws 54 and 55, one of the so-called "Kodak" thread and the other of the so-called "Congress" thread.

After insertion, this screw cannot escape from its guide, for it butts, on the one hand, against the edge of stage 36 bent to the shape of a palm-rest, and, on the other, against screw 34.

Moreover, in order to insert double-screw 50 into position in its guide, it is advisable to take stage 36 off its support by means of screw 34.

The depth of slot 51 is such that, when at rest, the end of screw 54 or 55 is flush with the top of stage 36, and it is by means of screw 50, which is easily reversible, as has been explained, that the camera is fixed at a suitable point along the slot in stage 36 by inserting the screw with a suitable thread into the corresponding nut.

What I claim is:

1. A portable camera supporting harness comprising a rigid frame formed to seat against the camera operator's chest and including laterally extending upper and lower frame portions, an upstanding tubular member, means mounting said tubular member on said upper and lower frame portions, an elongated post member adjustably telescoping into said tubular member, a plate forming a camera supporting stage, means adjustably mounting said plate on the upper end of said post member, a first harness strap connected to said upper frame portion at laterally spaced locations to extend around the nape of an operator's neck, and a second harness strap connected to the opposite sides of said rigid frame to extend around the upper portion of the operator's torso and hold said frame in position against the operator's chest.

2. A portable camera supporting harness according to claim 1; further comprising arm rest members carried by said frame.

3. A portable camera supporting harness according to claim 1; wherein at least one end of said plate forming a camera supporting stage is bent downwardly to define a hand rest so that the operator's hand manipulating a camera on said stage can be steadied against said hand rest.

4. A portable camera supporting harness according to claim 1; wherein said means mounting said tubular member on said upper and lower frame portions includes a weld securing the lower end of said tubular member to said lower frame member and brace members fixedly extending from said upper frame member in the forward direction and fixedly secured to the upper end portion of said tubular member so that the latter inclines forwardly from said frame.

5. A portable camera supporting harness according to claim 1; wherein the related ends of said upper and lower frame portions are connected together by curved side frame portions which arch toward each other to provide a frame of generally X-shaped configuration.

6. A portable camera supporting harness according to claim 1; wherein said tubular member is pivotally mounted at its lower end on said lower frame portion for swinging forwardly and rearwardly relative to said frame, and wherein said means mounting said tubular member on said upper frame portion is adjustable to vary the angle between said tubular member and said frame and the distance between said camera stage plate and the operator's head.

7. A portable camera supporting harness according to claim 6; wherein said means mounting said tubular member on said upper frame portion includes two spaced apart and arcuately slotted guide members extending forwardly from said upper frame portion and receiving said tubular member therebetween, and a locking screw carried by said tubular member and extending through the slots of said guide members to secure said tubular member to said guide members at a selected position along the slots of the latter.

8. A portable camera supporting harness according to claim 7; wherein said means mounting said tubular member on said lower frame portion includes spaced apart disc members on said lower frame portion, the lower end of said tubular member being bifurcated to receive said lower frame portion therein between said disc members.

9. A portable camera supporting harness according to claim 8; wherein said guide members are pivotally mounted on said upper frame portion, and including means for securing said guide members in fixed position relative to said upper frame portion so that, when the last mentioned securing means is loosened, said guide members can be swung into the plane of said frame.

10. A portable camera supporting harness according to claim 8; including a fitting fixed on said upper frame portion, said fitting having a central forwardly extending lug with a support pin extending laterally from the opposite sides thereof, and forwardly facing flat shoulders on said fitting in back of said support pin, said guide members having vertically elongated openings in the rear end portions thereof to receive said support pin at the opposite sides of said lug and straight rear edges formed with rounded lower corners, said straight rear edges normally bearing against said flat shoulders when said support pin is disposed in the upper portions of said elongated openings to prevent swinging of said guide members relative to said fitting, while lifting of said guide members, to disengage the bifurcated lower end of said tubular member from said lower frame portion, disposes said rounded lower corners of the rear edges adjacent said flat shoulders to permit swinging of said guide members downwardly relative to said fixed fitting.

References Cited in the file of this patent

UNITED STATES PATENTS

| | | |
|---|---|---|
| 1,018,771 | Newburger | Feb. 27, 1912 |
| 1,691,733 | Nordin | Nov. 13, 1928 |
| 1,993,485 | Paul | Mar. 5, 1935 |
| 2,552,205 | Moss | May 8, 1951 |
| 2,567,068 | Holmer | Sept. 4, 1951 |